United States Patent [19]
Anderson

[11] 3,773,129
[45] Nov. 20, 1973

[54] UNITARY COUPLING FOR ARTICULATED VEHICLES

[75] Inventor: Rodney H. Anderson, Naperville, Ill.

[73] Assignee: Caterpillar Tractor Co., Peoria, Ill.

[22] Filed: June 14, 1971

[21] Appl. No.: 152,511

[52] U.S. Cl. ............ 180/14 B, 180/51, 180/79.2 B, 280/492
[51] Int. Cl. .............................................. B60d 1/02
[58] Field of Search ............... 180/51, 53 R, 79.2 B, 180/14 B, 49, 50; 308/189, 207 R; 280/492

[56] References Cited
UNITED STATES PATENTS

| | | | |
|---|---|---|---|
| 2,835,397 | 5/1958 | Wagner | 180/51 X |
| 3,253,671 | 5/1966 | Fielding | 180/51 |
| 3,189,117 | 6/1965 | Ammon | 180/51 |
| 996,550 | 6/1911 | Zahn | 308/207 R |
| 2,827,715 | 3/1958 | Wagner | 180/51 X |
| 3,630,302 | 12/1971 | Holland, Sr. | 180/51 |

*Primary Examiner*—Albert J. Makay
*Attorney*—Charles M. Fryer et al.

[57] ABSTRACT

A compact unitary coupling for an articulated vehicle, including a generally annular coupling member having a cylindrical portion of relatively short length and large diameter which is trunnion mounted by means of stepped bearings in a longitudinal bore formed by one of the vehicle sections, the coupling member integrally forming bracket means to provide an articulated pivot joint with the other vehicle section and to pivotally support steering motor means coupled to the other vehicle section, a central drive shaft portion being mounted within the coupling member by bearings and connected with separate drive shafts in each of the vehicle sections by means of universal joints.

4 Claims, 5 Drawing Figures

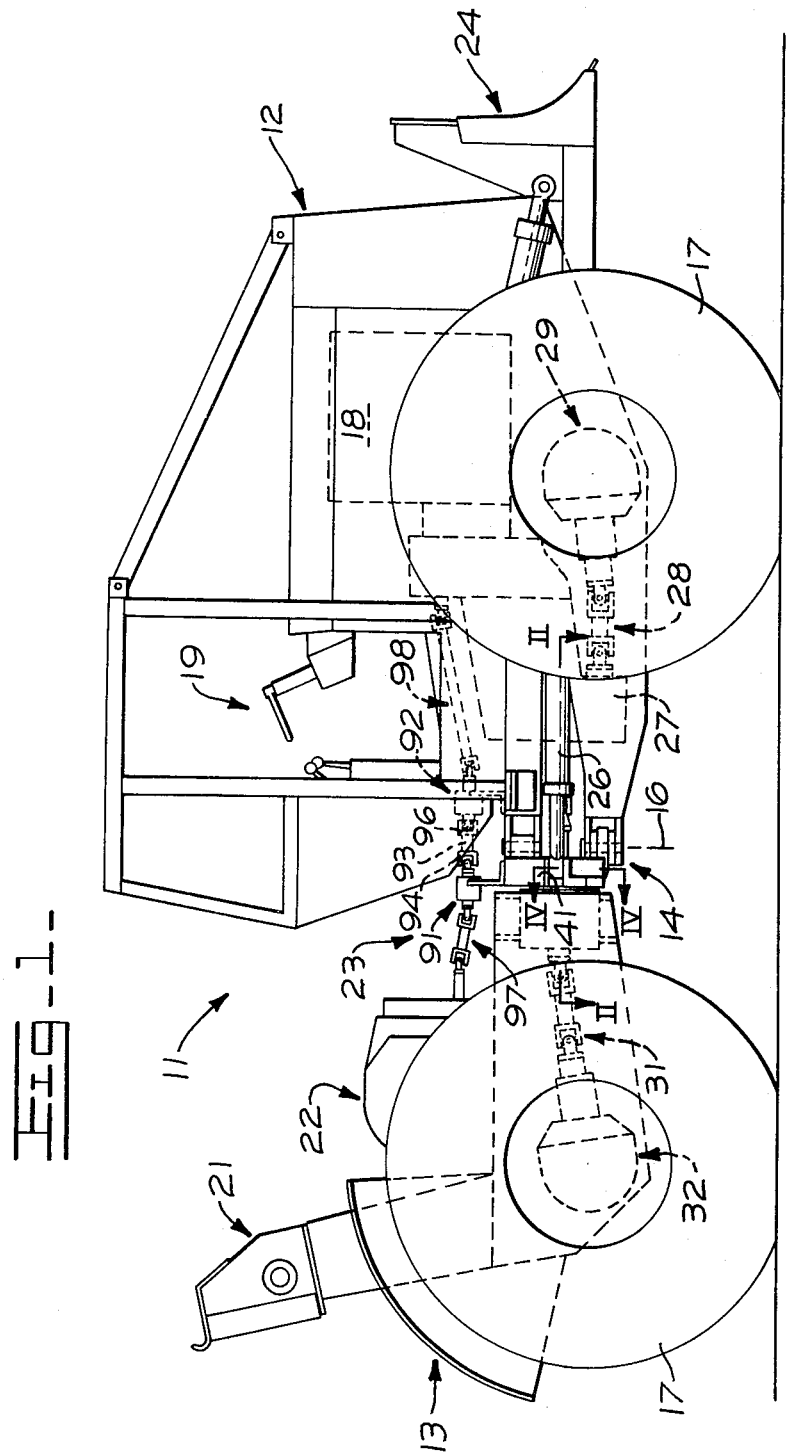

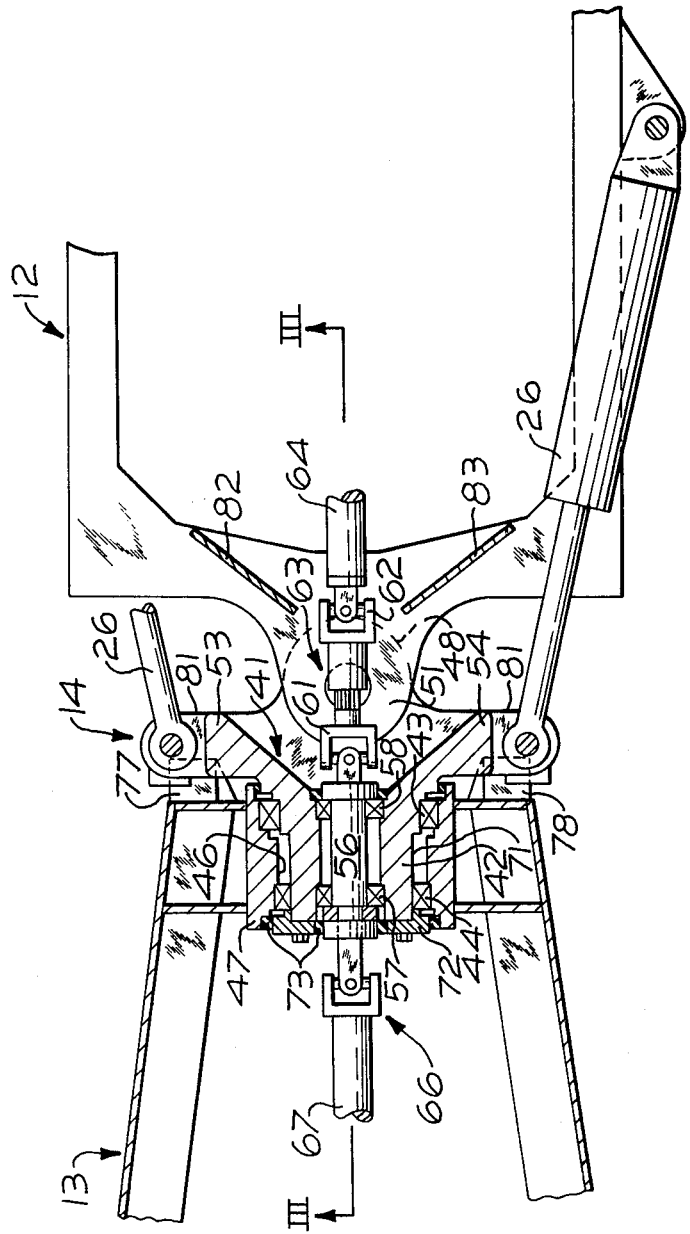

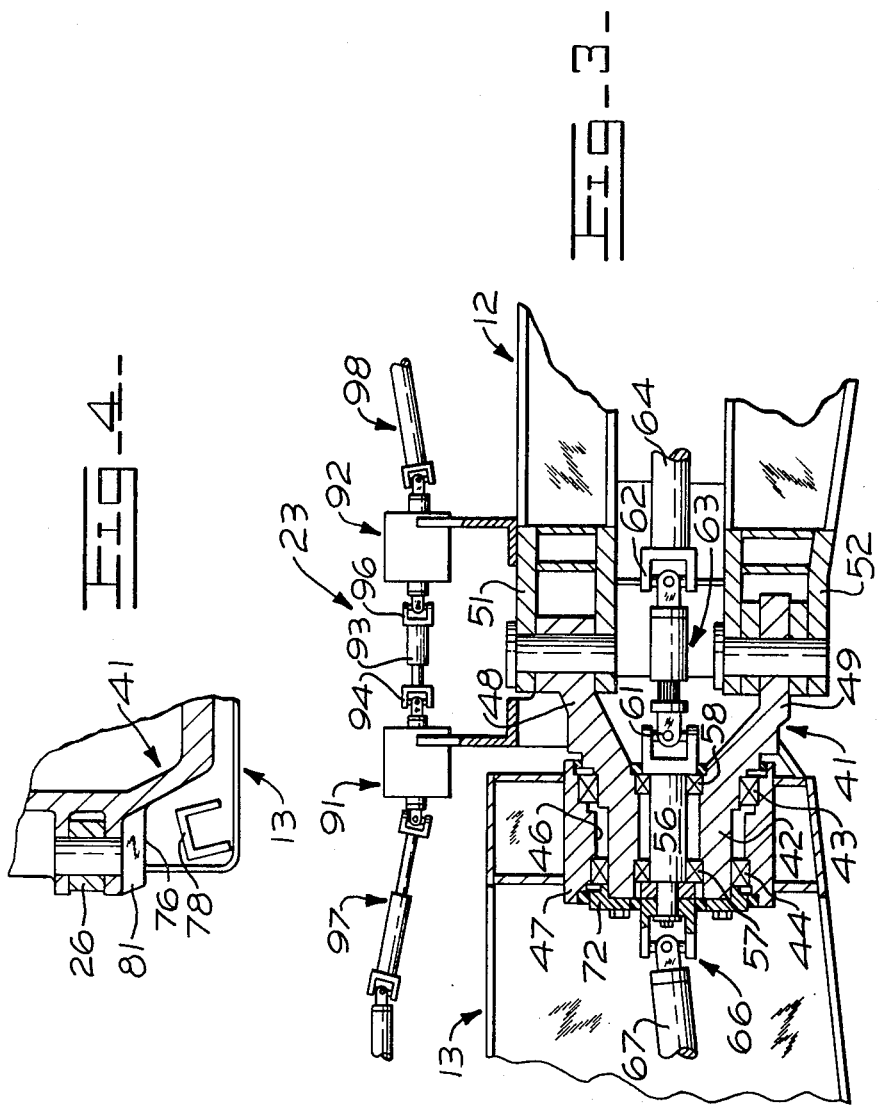

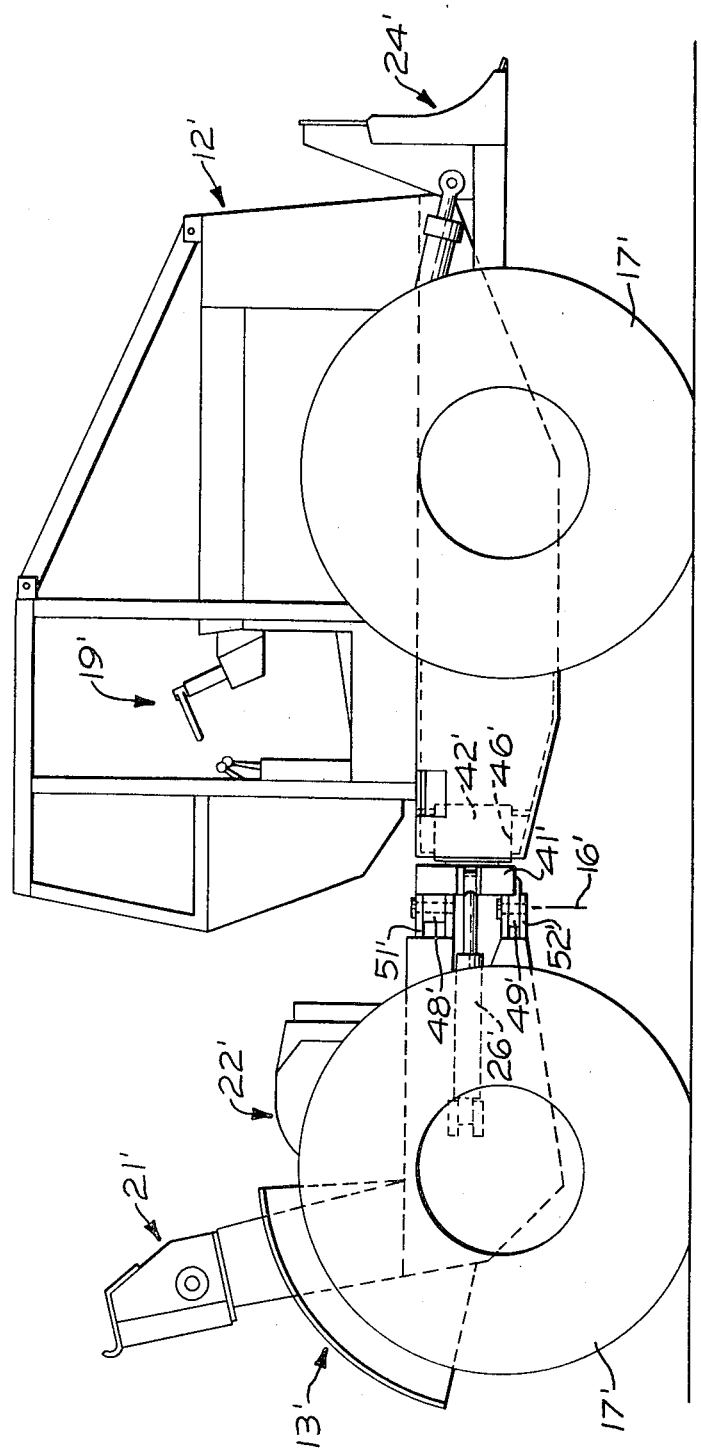

UNITARY COUPLING FOR ARTICULATED VEHICLES

The present invention relates to a coupling assembly for articulated vehicles and more particularly to such a coupling assembly which is of compact and unitary construction for facilitating its interconnection with two vehicle sections and for improving performance characteristics of the vehicle.

It is well known in the prior art to provide coupling means between two sections of a vehicle to permit articulated movement about a generally vertical pivot axis and to permit relative oscillation of the two vehicle sections about a longitudinally arranged axis of the vehicle. However, such prior art coupling assemblies normally include a substantial number of components which complicate assembly of the vehicle and increase the overall configuration of the coupling. The substantial size of such couplings often affects operating characteristics such as stability. Operator comfort may also be reduced since the location of the operator's station is often partially dictated by the configuration of the coupling.

Accordingly, it is an object of the present invention to provide a compact, unitary coupling arrangement between the front and rear sections of articulated vehicles.

It is a further object of the invention to provide such a coupling assembly including an annular coupling member adapted to facilitate interconnection with the two vehicle sections while permitting both relative articulation and oscillation therebetween.

Other objects and advantages of the present invention are made apparent in the following description having reference to the accompanying drawings.

IN THE DRAWINGS

FIG. 1 is a side view in elevation of a vehicle including two sections joined together by a coupling assembly embodying the present invention;

FIG. 2 is a plan view of the coupling taken along section line II—II of FIG. 1 to more clearly illustrate construction of the coupling assembly while showing fragmentary portions of the two vehicle sections;

FIG. 3 is a view taken along section line III—III of FIG. 2;

FIG. 4 is a fragmentary view of a portion of the coupling assembly and one of the vehicle sections taken along section line IV—IV of FIG. 1; and FIG. 5 is a view similar to FIG. 1 while illustrating an alternate embodiment of a coupling assembly constructed according to the present invention.

One embodiment of the coupling assembly of the present invention is illustrated within an articulated log skidder or vehicle 11 as shown in FIG. 1. The vehicle 11 includes a front section 12 and a rear section 13 which are joined together by means of a coupling assembly 14. The coupling 14 in combination with the two vehicle sections 12 and 13 permits articlated movement of the vehicle about a central vertical axis indicated at 16 while also permitting relative oscillation between the two vehicle sections about a horizontal axis of the vehicle as discussed in greater detail below. THe front vehicle section 12 and rear vehicle section 13 are supported by wheels 17. An engine 18 for driving the wheels and providing operating power for the vehicle is mounted upon the front vehicle section 12. An operator's station 19 is also preferably arranged upon the front vehicle section 12 and closely adjacent to the coupling 14.

The rear vehicle section 13 is preferably designed to provide the main load support for the vehicle. As shown in FIG. 1, the rear vehicle section 13 supports a logging arch 21 and a winch 22 which is powered by the engine 18 through a drive assembly 23. Although the logging components 21 and 22 which are mounted upon the rear section 13 comprise the main load engaging implements for the vehicle, additional implements may also be arranged upon the front vehicle section such as the bulldozer blade indicated at 24. The vehicle is steered by means of hydraulic jacks 26, the arrangement of which is described in greater detail below.

The vehicle is also adapted for four-wheel drive by means of the engine 18 which is conventionally associated with a transmission 27. A drive shaft arrangement 28 extends between the transmission 27 and a differential 29 for the wheels on the front vehicle section. The transmission 27 is also coupled in a manner described below with a separate drive shaft arrangement 31 which is connected to a differential 32 for the wheels on the rear vehicle section 13.

Referring also to FIGS. 2 and 3, the coupling 14 includes an annular coupling member 41 having a cylindrical portion 42 which is trunnion mounted by means of bearings 43 and 44 within a bore 46 formed by a trunnion housing 47 secured to the rear vehicle section 13. The trunnion mounting thus formed between the coupling member 41 and the rear vehicle section 13 provides the longitudinal axis about which relative oscillation of the two vehicle sections occurs. Diametrically opposed and vertically arranged brackets 48 and 49 (as may be best seen in FIG. 3) are integrally formed upon the coupling member 41 for pivotal interconnection with respective bifurcated brackets 51 and 52 on the front vehicle section 12 to provide the vertical articlation axis which is also illustrated in FIG. 1 at 16. A second pair of diametrically opposed brackets 53 and 54 are also integrally formed by the coupling member 41 and are offset with respect to the brackets 48, 49 for pivotal connection with the respective steering jacks 26 (as may be best seen in FIG. 2).

A separate drive shaft section 56 is also mounted within the coupling member 41 by means of bearings 57 and 58. One end of the drive shaft 56 is secured by means of a pair of universal joints 61, 62 and an intermediate extension joint 63 to a drive shaft 64 arranged on the front vehicle section 12 and coupled with the transmission 27. The other end of the drive shaft 56 is coupled by means of a universal joint 66 to a drive shaft 67 forming a portion of the drive arrangement 31 (see FIG. 1) for the rear differential 32. Mounting the central drive shaft 56 on bearings within the coupling member 41 facilitates operation of the entire drive arrangement for the rear wheels at relatively high speeds.

In addition, the separable arrangement of the drive shaft 56 within the coupling member 41 further contributes to unitary construction of the coupling assembly 14. For example, the coupling assembly 14 may be preassembled with the shaft 56 properly arranged within the coupling member 41 on the bearings 57 and 58. The coupling may then be simply coupled with the rear vehicle section by inserting the cylindrical portion 42 of the coupling member within the trunnion support housing 47. The various brackets on the coupling member may then be pinned to the brackets 51, 52 on the front vehicle section and the hydraulic steering jacks 26 respectively. The drive shaft 56 may also be coupled with the drive shafts 64 and 67 by means of the universal joints 61 and 66 to complete interconnection of the coupling between the two sections of the vehicle.

To further facilitate assembly of the coupling 14 with the rear vehicle section 13, both the outer surface 71 of the cylindrical portion 42 and the bore 46 are stepped to permit the bearing 43 to be somewhat larger in diameter than the bearing 44, thus simplifying arrangement of the coupling member 41 within the housing 47. A retaining plate 72 is secured to a rearward end of the coupling member 41 to properly position the coupling member 41 within the housing 47 and to establish a proper pre-load for the bearings 43 and 44. It may be noted that both of the bearings 43 and 44 are of relatively large diameter, thus permitting them to be placed relatively close to each other while providing proper support for the coupling member 41 within the rear vehicle section 13 and further contributing to the compact design of the coupling assembly 14. Suitable seals, indicated at 73, for example, are arranged at the opposite ends of the cylindrical section 42 of the coupling member to prevent dirt or other foreign material from approaching the bearings 43, 44 and 57, 58.

The coupling member 41 also integrally forms stop surfaces for limiting relative articulated motion of the two frame sections as well as for limiting relative oscillatory movement therebetween. Referring particularly to FIGS. 2 and 4, each of the brackets 53 and 54 has a stop surface 76 respectively arranged above stop blocks 77 and 78 on the rear vehicle frame 13 when the coupling is properly assembled within the vehicle. Thus, interaction of the stop surfaces 76 with the stop blocks 77 and 78 tends to limit oscillatory movement in either direction between the frames. To similarly limit articulated motion between the frame sections, additional stop surfaces 81 are formed on the brackets 53 and 54. The stop surfaces 81 face toward the frame section 12 for interaction with stop plates 82 and 83 to limit articulated motion between the frame section particularly when the vehicle is turning in either direction.

It is particularly contemplated that a mechanical drive coupling be provided for directly powering the winch 22 from the engine 18 (see FIG. 1). The drive train 23 provided for this purpose is also designed to facilitate unitary construction of the coupling 14 while reducing stress within the implement drive train 23 during operation of the vehicle. As may be seen in FIGS. 1 and 3, bearing mounts or housings 91 and 92 are arranged respectively upon the coupling member 41 and the front frame section 12. A central drive shaft 93 together with universal joints 94 and 96 at each end thereof, are arranged between the bearing mounts 91 and 92. A separate drive shaft arrangement 97 including a pair of universal joints is arranged between the bearing block 91 and the winch 22 with an additional drive shaft arrangement 98 being employed upon the front vehicle section 12 so that the various drive train components as described above couple the engine 18 or a component driven thereby with the winch 22. As may be seen in FIG. 3, the drive shaft 93 forms a telescoping joint. Thus, upon articulation of the vehicle, only that portion of the drive train 23 between the bearing mounts 91 and 92 is subject to bending stresses. During oscillation, only the drive train portion 97 tends to be subjected to bending stresses.

Another embodiment of the present invention is illustrated in FIG. 5 with a coupling having similar components and being arranged between similar articulated sections of a vehicle. Accordingly, various portions of the vehicle and coupling in FIG. 5 are indicated by primed numerals corresponding to those employed in FIGS. 1 – 4. The major difference between the two embodiments is that in FIG. 5, the longitudinal or oscillatory axis is arranged within the front vehicle section 12' while the vertical or articulation axis 16' is formed between the coupling member 41' and the rear vehicle section 13'. The relatively short bearing spread for supporting the coupling member 41' within the front vehicle section 12' is of particular importance in this configuration due to the limited amount of space available because of the arrangement of the engine and transmission, for example, upon the front vehicle section. This configuration also serves to still further improve stability of the vehicle because of the relative location of the vertical articulation axis and the horizontal or oscillation axis.

In considering this feature of the invention, it is important to note that because of the engine, transmission and other drive components being located upon the front vehicle section 12', the weight of that section is greater than the rear vehicle section at least when the vehicle is not subject to an external load. It is primarily contemplated that an external load would be applied to the rear vehicle section 13', for example, by means of the arch 21'. It has been found that such an external load applied to the rear section 13' may tend to raise the forward vehicle section 12' off the ground, particularly when the horizontal pivot is arranged between the vertical or articulation axis and the external load applied to the vehicle. This condition is most likely to occur when the vehicle is turning while being subjected to such an external load. Because of the arrangement of the horizontal axis as shown in FIG. 5, the full weight of the forward vehicle section 12' tends to prevent its being raised off the ground. In addition, with the arrangement shown in FIG. 5, the forward vehicle section 12' can still oscillate about the longitudinal axis, to follow uneven terrain, for example, even when the vehicle is turning and carrying a substantial external load on its rear section.

What is claimed is:

1. A compact, unitary coupling for an articulated vehicle having front and rear sections, the coupling permitting articulation of the vehicle sections about a central vertical axis comprising an annular coupling member having a cylindrical portion trunnion mounted in a longitudinal bore formed on one of the vehicle sections by means of a pair of longitudinally spaced apart bearings, to permit oscillation between the two vehicle sections, the bearings being of relatively large diameter and being arranged relatively close together to achieve a compact configuration for the coupling, one of the bearings arranged adjacent the articulated axis being of greater diameter than the other bearing to facilitate assembly of the unitary coupling with the one vehicle section, an outer surface of the cylindrical coupling member portion and the longitudinal bore in the one vehicle section being stepped to receive the bearings of different diameters for supporting the coupling member portion in the bore, the coupling member integrally including a first pair of diametrically opposed brackets which are pivotally coupled to respective portions of the other vehicle section, the coupling member also integrally including a second pair of diametrically opposed brackets offset relative to the first pair of brackets for pivotal connection with the other vehicle section by means of steering motor means, the coupling member also integrally including first stop surfaces arranged for interaction with stop means of the one vehicle section to limit relative oscillatory movement of the vehicle sections and second stop surfaces arranged for interaction with stop means on the other vehicle section, and a central drive shaft being mounted within the coupling member by bearing means and connected with separate drive shafts in the two vehicle sections by universal joints.

2. The coupling of claim 1 wherein an engine for driving the vehicle is arranged on the other vehicle section.

3. The coupling of claim 1 wherein an engine for driving the vehicle is arranged on the one vehicle section and an implement for receiving an external load is mounted on the other vehicle section.

4. The coupling of claim 1 wherein the vehicle includes an engine on a first one of the vehicle sections and an implement on the second one of the sections adapted for mechanical operation by the engine through a drive train including a telescoping shaft and a pair of universal joints arranged between bearing blocks secured respectively to the first vehicle section, the drive train also including a telescoping shaft and a pair of universal joints adjacent the implement.

* * * * *